(12) United States Patent
Christenson et al.

(10) Patent No.: US 9,087,065 B2
(45) Date of Patent: *Jul. 21, 2015

(54) MANAGING AN ALIAS HOST AND DOMAIN NAMES ON A DNS SERVER

(71) Applicant: International Business Machines Corporation, Armonk, NY (US)

(72) Inventors: David A. Christenson, Fergus Falls, MN (US); Christopher T. Gloe, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 199 days.

This patent is subject to a terminal disclaimer.

(21) Appl. No.: 13/688,363

(22) Filed: Nov. 29, 2012

(65) Prior Publication Data

US 2013/0091100 A1  Apr. 11, 2013

Related U.S. Application Data

(63) Continuation of application No. 12/846,160, filed on Jul. 29, 2010, now Pat. No. 8,560,659.

(51) Int. Cl.
G06F 15/16 (2006.01)
G06F 17/30 (2006.01)
H04L 29/12 (2006.01)

(52) U.S. Cl.
CPC ...... *G06F 17/30117* (2013.01); *H04L 61/1511* (2013.01)

(58) Field of Classification Search
None
See application file for complete search history.

(56) References Cited

U.S. PATENT DOCUMENTS

| 6,578,078 B1 | 6/2003 | Smith et al. |
| 6,782,003 B1 | 8/2004 | Giroux et al. |
| 2012/0030274 A1 | 2/2012 | Christenson et al. |

*Primary Examiner* — Scott B Christensen
(74) *Attorney, Agent, or Firm* — Patterson & Sheridan, LLP

(57) ABSTRACT

Embodiments of the invention provide a method of managing aliases on a server, including deleting unused aliases, while minimizing required administrator interaction. The server may include expirable alias records, containing an expiration value and an inactivity timer. An alias manager component may process the expirable records. If the alias manager component determines a particular record has expired, the alias manager component may delete that record.

7 Claims, 6 Drawing Sheets

MANAGING AN ALIAS HOST AND DOMAIN NAMES ON A DNS SERVER

CROSS-REFERENCE TO RELATED APPLICATIONS

This application is a continuation of U.S. patent application Ser. No. 12/846,160, filed Jul. 29, 2010. The aforementioned related patent application is herein incorporated by reference in its entirety.

BACKGROUND

1. Field

The invention relates to aliases on a Domain Name System (DNS) server. More specifically, the invention relates to managing expirable alias records in a DNS database.

2. Description of the Related Art

For many businesses, changing the address of an established web resource is a nontrivial task. In particular, a business may wish for requests sent to the old address of the web resource to still function, at least for some amount of time. For example, users may have bookmarked the web resource under the old address. As a second example, the old address may be hard-coded into various applications, and the business may wish these applications to continue functioning until each application can be updated to point to the new address. As such, the business may wish for the web resource to still be available at the old address. However, businesses may not wish to continue paying domain registration fees indefinitely for all their older domain names. Currently, web administrators are required to manually track and manage older addresses and find a way to handle any requests that reference them. As such, managing requests that reference the old address of the web resource can take a substantial amount of time and resources, and can quickly become a burden on businesses.

SUMMARY

The present disclosure generally provides techniques for managing aliases.

One embodiment of the invention provides a method of managing aliases on a server, including: reading an expirable record contained on the server, wherein the expirable record includes an expiration value and an inactivity timer, and wherein the expirable record specifies an alias value mapping a first address to a second address. The method further includes determining whether the expiration value of the expirable record has passed, by comparing the expiration value with a current value. Additionally, the method includes determining whether the expirable record has been queried within a period of time specified by the inactivity timer; and if the expiration value of the expirable record has passed, and if the expirable record has not been queried within the period of time specified by the inactivity timer, deleting the expirable record.

Another embodiment of the invention provides a computer-readable storage medium containing a program which, when executed, performs an operation, including:

reading an expirable record contained on the server, wherein the expirable record includes an expiration value and an inactivity timer, and wherein the expirable record specifies an alias value mapping a first address to a second address. The operation further includes determining whether the expiration value of the expirable record has passed, by comparing the expiration value with a current value. Additionally, the operation includes determining whether the expirable record has been queried within a period of time specified by the inactivity timer; and if the expiration value of the expirable record has passed, and if the expirable record has not been queried within the period of time specified by the inactivity timer, deleting the expirable record.

Yet another embodiment of the invention provides a system, including: a computer processor; and a memory containing a program that, when executed on the computer processor, performs an operation for managing aliases. The operation includes: reading an expirable record contained on the server, wherein the expirable record includes an expiration value and an inactivity timer, and wherein the expirable record specifies an alias value mapping a first address to a second address. The operation further includes determining whether the expiration value of the expirable record has passed, by comparing the expiration value with a current value. Additionally, the operation includes determining whether the expirable record has been queried within a period of time specified by the inactivity timer; and if the expiration value of the expirable record has passed, and if the expirable record has not been queried within the period of time specified by the inactivity timer, deleting the expirable record.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
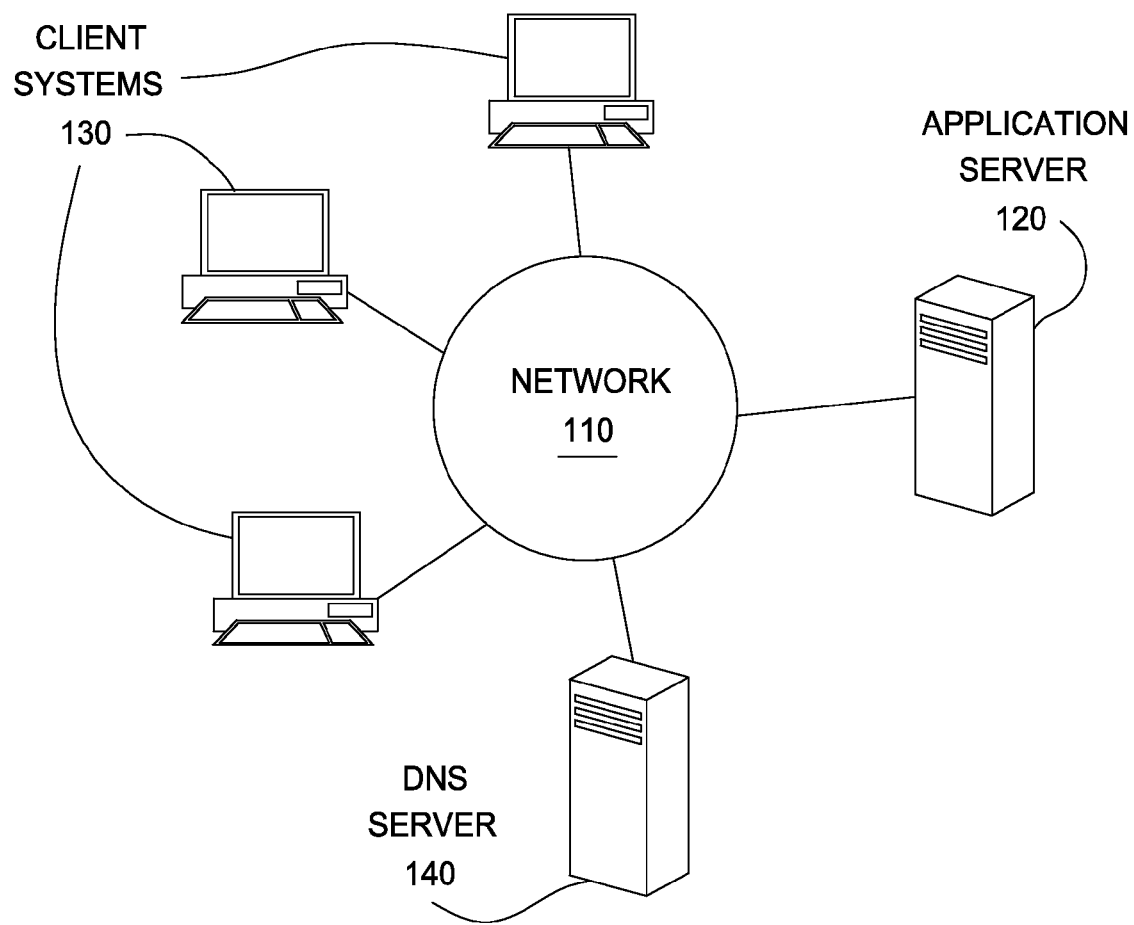
FIG. 1 is a block diagram of a networked environment configured to communicate using domain names, according to one embodiment of the invention.

Various methods for rerouting traffic from an old hostname to a new hostname may be considered. However, many methods are unsatisfactory for one or more reasons. For example, one method of rerouting traffic is by the use of an alias record. A network administrator may currently create an alias to the new hostname using a CNAME record for the old hostname on a Domain Name System (DNS) server. When the DNS server receives a request for the old hostname, the DNS server may process the CNAME alias record for the old hostname. The DNS server may then redirect the request as a request for the new hostname, with the end result being the DNS server returns the IP address for the new hostname. However, one drawback to this method is that now the network administrator must maintain two separate DNS entries for the same web resource—one for the old hostname, and one for the new hostname. Furthermore, the use of either the CNAME record or the DNAME record requires the network administrator understands complex networking configuration concepts, and as such may not be feasible for less knowledgeable network administrators.

Another method of rerouting traffic to a new domain name is through the use of a DNAME record. The DNAME record is similar to a CNAME record in some ways, but provides a way to create an alias for an entire domain. However, one drawback to the use of a DNAME record is that it may require a DNS resolver to send two DNS queries, as opposed to one, thus generating double the DNS traffic. Furthermore, there is currently no mechanism to automatically delete the alias hostname after all client and server applications have been migrated to use the new domain name.

Embodiments of the invention generally provide preferable methods of managing expirable records in a DNS database. Each expirable record may contain an alias from an old hostname to a new hostname. Furthermore, each expirable record may include an expiration value and an inactivity timer. An alias manager component may process each expirable record and, if the expiration value has passed and if the record has not been accessed within a time specified by the inactivity timer, delete the expirable record.

In one embodiment, the alias manager component may first read a record that aliases an old hostname to a new hostname. The alias manager component may then determine whether the record is an expirable record, where an expirable record contains an expiration value and an inactivity timer. In one embodiment, the alias manager component may have presented a user with a user interface and created the expirable record based on input from the user. If the record is an expirable record, the alias manager component may determine whether the old hostname specified in the record has been accessed within a number of days specified by the inactivity timer. The alias manager component may also determine if the expiration value for the record has passed. If the expiration value for the record has passed, but the old hostname specified by the record has been accessed recently, the alias manager component may update the expiration value of the record to a preset number of days after the current date. If the old hostname of the record has not been accessed within the predetermined number of days, and if the expiration value for the record has passed, the alias manager component may conclude the record has expired and delete the record.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, FIG. 1 is a block diagram of a networked environment configured to communicate using domain names, according to one embodiment of the invention. The networked environment 100 contains a plurality of client systems 130, an application server 120 and a DNS server 140, all interconnected by a network 110. The application server 120 may contain a web server and web applications that may be accessed by the client systems 130.

The client systems 130 may access content on the application server 120 by use of the network 110. One method the client systems 130 may use to access the application server 120 is by specifying an IP address for the application server 120. Alternatively, the client systems 130 may access the content by specifying a host and domain name for the application server 120. The client systems 130 may then query the DNS server 140 with the specified domain name. The DNS server 140, in response to the query, may reply with an IP address associated with the host name and the domain name specified in the request. Upon receiving the response, the client systems 130 may use the returned IP address to access content on the application server 120.

However, at some point, a business may wish to change the domain name its application server 120 to a new domain name, but may wish for traffic directed to the old domain name to be redirected to the new domain. In this case, the DNS server 140 may contain an alias from the old domain name for the application server 120 to the new domain name. In one embodiment, an administrator may use a CNAME record to create this alias. However, such a CNAME record must currently be created and managed manually. For example, while the business may wish for customers to be able to access their application server 120 using the old domain name shortly after the domain name change, the business may not wish to continue paying for the old domain indefinitely. However, there is currently no automatic way for the business to determine whether customers are still accessing the old domain name. Instead, the administrator must manually check the DNS request logs for the CNAME alias record and, if it is no longer being accessed, delete the CNAME record. While managing a single alias requires minimal work on the part of the administrator, this can quickly become a cumbersome task as the number of aliases grows.

In one embodiment, the DNS server 140 may contain an alias manager component. The alias manager component may monitor requests for alias records on the DNS server 140. This monitoring may be done in either real-time or performed periodically as a batch job. The alias manager component may associate an expiration value and an inactivity timer with a particular record in order to create an expirable record. In one embodiment of the invention, an expirable record is a record that will be automatically deleted on the expiration value specified for the record. Furthermore, when the domain name for the expirable record is referenced in a DNS request, the alias manager component may update the expiration value for the record based on a number of days specified by the inactivity timer for the record. For example, assume the inactivity timer for a given expirable record is 60 days, the expiration value for the record is May 2, 2010, and the current date is May 1, 2010. If a client system 130 then submits a request to the DNS server 140 for the domain name specified in the expirable record, the alias manager component may update the expiration value for the record to be 60 days (specified by the inactivity timer) from the current date, and thus update the expiration value to be Jun. 30, 2010. Continuing with the example, if on Jun. 30, 2010, the DNS server 140 has not received any requests for the domain name specified in the expirable record, the alias manager component may conclude that the record has expired and delete the record.

Figure 2:
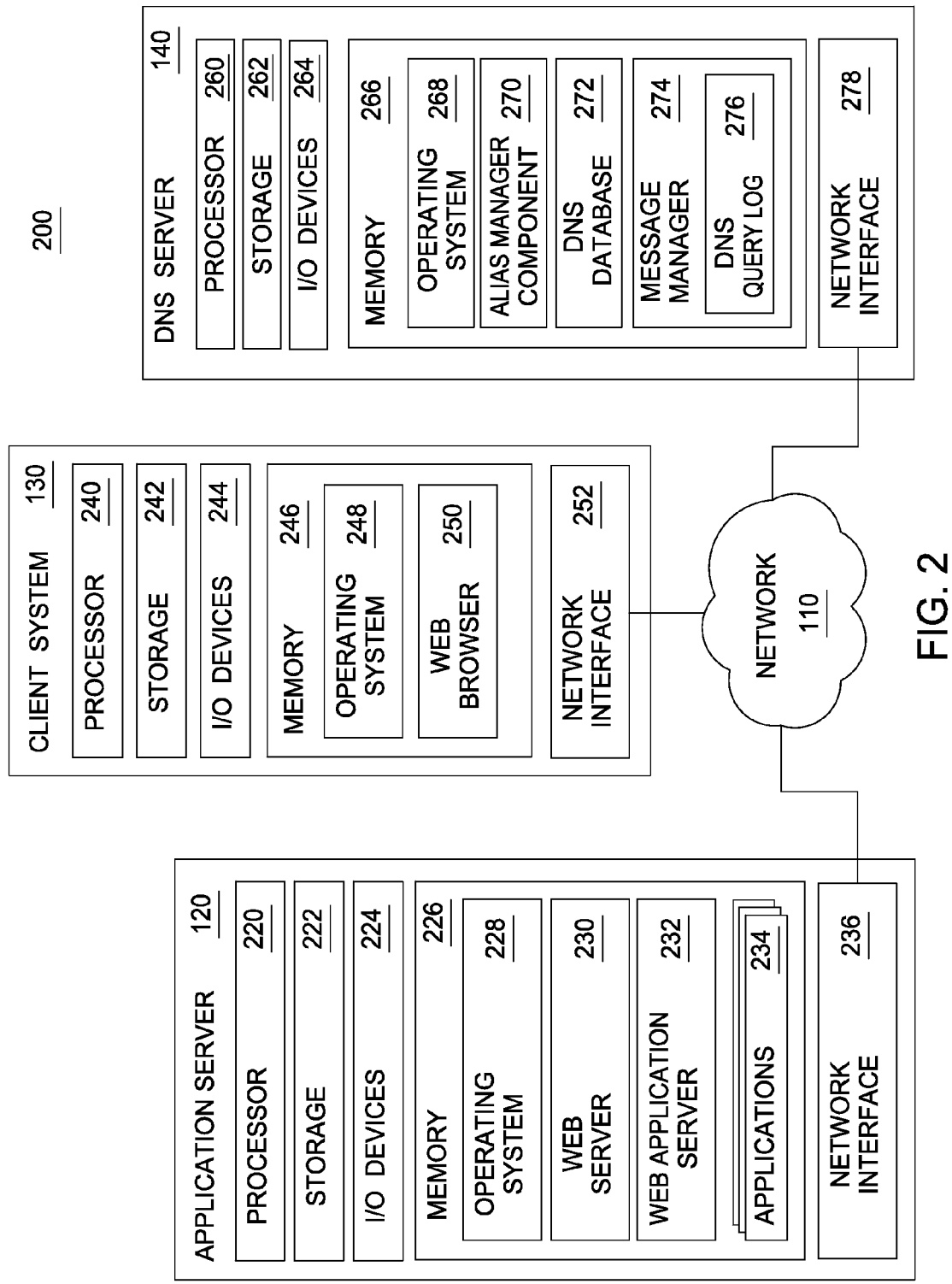
FIG. 2 is a block diagram of components of a networked environment configured to run an alias manager component, according to one embodiment of the invention.

FIG. 2 is a block diagram of components of a networked environment configured to run an alias manager component, according to one embodiment of the invention. As shown, the environment 200 contains an application server 120, a client system 130, and a DNS server 140, all interconnected via the network 110. The application server 120 includes computer processor(s) 220, storage media 222, one or more I/O devices 224, system memory 226, and a network interface 236. Computer processor 220 may be any processor capable of performing the functions described herein. I/O devices 224 may represent a variety of input and output devices, including keyboards, mice, visual displays, printers and so on. The network interface 236 may allow the application server 120 to connect to and communicate over the network 110, and may be capable of both sending and receiving network messages. Furthermore, as will be understood by one of ordinary skill in the art, any computer system capable of performing the functions described herein may be used.

In the pictured embodiment, memory 226 contains an operating system 228, a web server 230, a web application server application 232, and web applications 234. The memory 226 may include one or more memory devices having blocks of memory associated with physical addresses, such as random access memory (RAM), read only memory (ROM), flash memory or other types of volatile and/or non-volatile memory. The operating system 228 may be any operating system capable of performing the functions described herein. As shown, memory 226 also contains a plurality of web applications 234. The web applications 234 may be hosted by the web server application 230. Additionally, web pages associated with the web applications 234 may be served to users by the web server application 230.

Additionally, the environment 200 also contains a client system 130. The client system 130 includes computer processor(s) 240, storage media 242, one or more I/O devices 244, system memory 246, and a network interface 252. Computer processor 240 may be any processor capable of performing the functions described herein. I/O devices 244 may represent a variety of input and output devices, including keyboards, mice, visual displays, printers and so on. The network interface 252 may allow the client system 130 to connect to and communicate over the network 110, and may be capable of both sending and receiving network messages. Furthermore, as will be understood by one of ordinary skill in the art, any computer system capable of performing the functions described herein may be used.

As shown, memory 246 contains an operating system 248 and a web browser 250. The memory 246 may include one or more memory devices having blocks of memory associated with physical addresses, such as random access memory (RAM), read only memory (ROM), flash memory or other types of volatile and/or non-volatile memory. The operating system 248 may be any operating system capable of performing the functions described herein. The web browser application 250 may be any software application capable of retrieving, displaying and navigating web pages.

The environment 200 further contains a DNS server 130. The DNS server 130 includes computer processor(s) 260, storage media 262, one or more I/O devices 264, system memory 266, and a network interface 278. Computer processor 260 may be any processor capable of performing the functions described herein. I/O devices 264 may represent a variety of input and output devices, including keyboards, mice, visual displays, printers and so on. The network interface 278 may allow the DNS server 130 to communicate over the network 110, and may be capable of both sending and receiving network messages. Furthermore, as will be understood by one of ordinary skill in the art, any computer system capable of performing the functions described herein may be used.

In the pictured embodiment, memory 266 contains an operating system 268, an alias manager component 270, a DNS database 272, and a message manager 274. The memory 266 may include one or more memory devices having blocks of memory associated with physical addresses, such as random access memory (RAM), read only memory (ROM), flash memory or other types of volatile and/or non-volatile memory. The operating system 268 may be any operating system capable of performing the functions described herein. The DNS database 272 may contain DNS records that contain a domain name and a current IP address associated with the domain name. In one embodiment of the invention, the DNS database 272 may contain expirable records, which contain both an inactivity timer and an expiration value.

The message manager 274 may generally receive DNS queries for various domains, search the DNS database 272 for the domains, and respond with IP addresses associated with the domains. The message manager 274 also contains a DNS query log 276, which the message manager 274 may use for logging received DNS queries. For example, the message manager 274 may receive a DNS query that specifies domain name "mydomain.com". Upon receiving the DNS query, the message manager 274 may lookup "mydomain.com" in the DNS database 274 to determine the current IP address associated with the specified domain name is "10.0.0.100". Once the message manager has queried the DNS database, the message manager may return the current IP address of "10.0.0.100" to the requestor. The message manager may then log the receipt of the DNS query in the DNS query log 276.

The DNS database 272 may also contain an alias record. An alias record maps from one host to another, from one domain to another, or both. Illustratively, consider the address "www.olddomain.com". As used herein, the host refers to the "www" portion of the address, while the domain refers to the "olddomain.com" portion of the address. Thus, an alias for the address "www.olddomain.com" may map the "www" host to a new host, the "olddomain.com" to a new domain, or map the complete address of "www.olddomain.com" to both a new host name and domain name. For example, assume a user currently hosts his website on the domain "olddomain.com" and then purchases the domain "newdomain.com". In this example, the user may wish for users to still be able to access his website at the old domain name of "olddomain.com", at least for a specified period of time. To accomplish this, the user may create an alias record that maps from "olddomain.com" to "newdomain.com". Thus, when the DNS server 140 receives a DNS query for "olddomain.com", the message manager 274 may lookup "olddomain.com" in the DNS database 272, retrieve the alias record that maps to "newdomain.com", and then return the current IP address associated with "newdomain.com".

As shown, memory 266 also contains an alias manager component 270. In one embodiment of the invention, the alias manager component 270 may create and manage expirable records in the DNS database 272. As used herein, an expirable record refers to any record containing an expiration value, specifying a particular point in time when the record becomes invalid. In one embodiment, the expiration value is represented by an expiration date. Furthermore, an expirable record may contain an inactivity timer. The inactivity timer may specify an amount of time that must pass after the record is queried before the record expires. Continuing the above example, the alias manager component 270 may create an expirable alias record that maps from "olddomain.com" to "newdomain.com", has an expiration value of May 1, 2010 and an inactivity timer of 15 days. If on May 1, 2010, no user has accessed the record in the past 15 days, the alias manager component 270 may conclude the alias record has expired and accordingly delete the record. However, if on Apr. 30, 2010, the message manager 274 received a DNS query for "olddomain.com", then the alias manager component 270 may offset the expiration value by the amount of time specified by the inactivity timer, and thus update the expiration value of the record to May 16, 2010.

Figure 3:
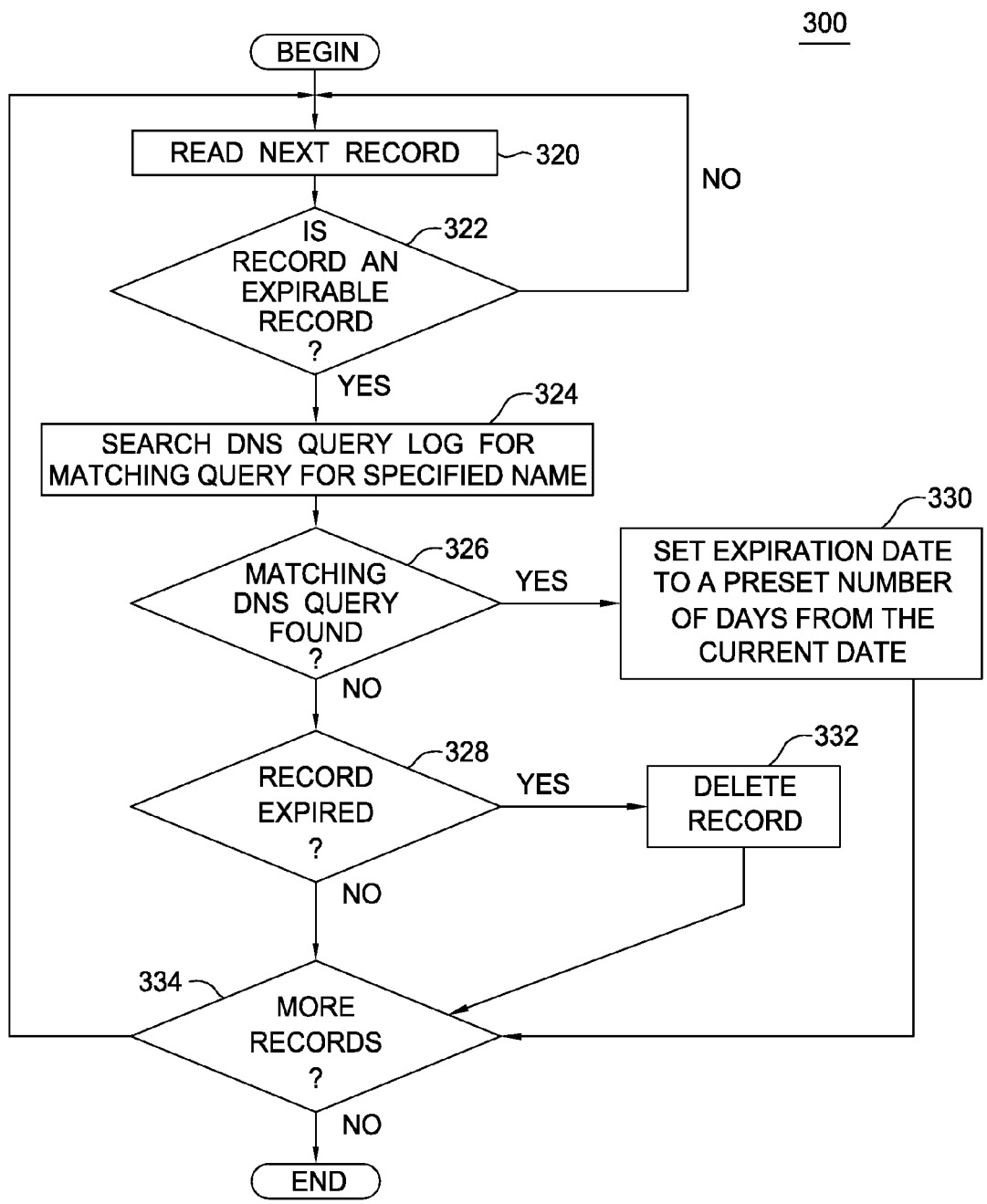
FIG. 3 is a flow diagram illustrating a method for managing expiring records in a DNS database.

FIG. 3 is a flow diagram illustrating a method for managing expiring records in a DNS database. As shown, the method 300 begins at step 320, where the alias manager component 270 reads a next record stored in the DNS database 272. Once the record is read, the alias manager component 270 determines whether the record is an expirable record (step 322). In one embodiment, this determination is made by determining whether the record has an expiration value and an inactivity timer. In another embodiment, the record may include a tag indicating that it is an expirable record.

In an alternate embodiment, the alias manager component 270 may create the expirable record based on user input. The alias manager component 270 may present the user with an interface for modifying an existing record. The interface may include, for instance, an IP address field, a subnet mask field, a host field, and a domain field. The alias manager component 270 may prompt the user to determine if the user wishes to modify an existing record, or if the user wishes to create a new record and convert the existing record into an expirable alias record. If the user opts to create a new record and convert the existing record into an expirable alias record, the alias manager component 270 may further prompt the user to determine an expiration value and an inactivity timer for the expirable alias record. In one embodiment, the alias manager component 270 may use default values for one or both of the expiration value and the inactivity timer. Once the user input has been received, the alias manager component 270 may create a new record containing the modified information, and modify the existing record to alias the new record, and include the expiration value and inactivity timer.

If the alias manager component 270 determines the record is not an expirable record, the method begins again at step 320, where the alias manager component 270 reads the next record. If the alias manager component 270 determines the record is an expirable record, the alias manager component 270 searches the DNS query log 276 for a query for the hostname specified by the expirable record (step 324). In one embodiment, the alias manager component 270 only searches as far back chronologically in the DNS query log 276 as the period of time specified in the inactivity timer for the record. If the alias manager component 270 finds a matching DNS query for the record (step 326), the alias manager component 270 updates the expiration value of the expirable record (step 330). In one embodiment, the alias manager component 270 updates the expiration value of the expirable record to the current date, plus a number of days specified by the inactivity timer for the record. For example, if the current date is May 1, 2010, and the inactivity timer specifies 15 days, the alias manager component 270 may set the expiration value of the record to May 16, 2010.

In an alternate embodiment, the alias manager component 270 may instead process every query in the DNS query log 276 at once, rather than searching the DNS query log 276 for each record in the DNS database 272. That is, the alias manager component 270 may process each query in the DNS query log 276, and for each query, if the query specifies an expirable record, the alias manager component 270 may update the expiration value of the expirable record based on a preset value and the current date. This embodiment may be preferred, if, for instance, a system does not have an efficient way of searching through the DNS query log 276. For example, assume the only way to search through the DNS query log 276 in a particular embodiment is to iterate through each query in the DNS query log 276. In that case, it may be more efficient to simply process each query in the log 276 once, and to update all of the expiration values for the corresponding expirable records accordingly. In other words, in this example, the alias manager component 270 may avoid processing the entirety of the DNS query log 276 multiple times (once for each expirable record), and may instead only process the DNS query log 276 once. However, in other embodiments, particularly where an efficient searching method exists for searching the DNS query log, method 300 may be preferred.

Returning to method 300, once the expiration value has been updated, the alias manager component 270 determines whether there are more records in the DNS database 272 to process (step 334). If there are more records to process, the method begins again, with the alias manager component 270 reading the next record (step 320). If there are no more records to read, the method ends.

However, if after searching the DNS query log 276 for a matching query for the record (324) the alias manager component 270 does not find any matching queries (step 326), then the alias manager component 270 determines whether the expirable record is expired (step 328). In one embodiment, the alias manager component 270 makes this determination by comparing the expiration value of the record to the current date. If the expiration value is at or before the current date, then the alias manager component 270 may conclude the record has expired. For example, if the expiration value is Apr. 1, 2010, and the current date is May 1, 2010, the alias manager component 270 may compare the two dates and conclude that the record has expired. If the alias manager component 270 determines the record has expired, the alias manager component 270 deletes the record 332 from the DNS database 272 (step 332). If the alias manager component 270 determines the record has not expired (step 328), or once the alias manager component 270 deletes the record (step 332), the alias manager component 270 determines whether there are more records in the DNS database 272 to process (step 334). If there are more records to process, the method begins at step 320, where the alias manager component 270 reads the next record. If there are no more records to process, the method ends.

One advantage to method 300 is that it allows for DNS records to be managed and for expired records to be deleted automatically. As noted above, this task must currently be performed manually, and requires an administrator to manually inspect the records and determine which records to delete and when to delete the records. Furthermore, in one embodiment of the invention, the method 300 can be scheduled to run automatically at periodic intervals and perform batch processing on all the records in the DNS database 272. Thus, once the expirable records have been created and configured with the desired expiration values and inactivity timers, the alias manager component 270 may automatically manage the records and if it determines a particular record has expired, the alias manager component 270 may delete the record on its own.

A second advantage to the method 300 is that, in determining whether a record has expired (and thus whether it should be deleted), the method 300 takes into account whether users are still accessing the address specified by the expirable record. That is, if a particular record is still being frequently accessed by DNS queries, the alias manager component 270 will push the expiration value for the record forward by the period of time specified in the inactivity timer. As such, a record will only be deleted once its expiration value has passed, and furthermore once it has not been accessed within an amount of time specified by the inactivity timer. Through the use of the inactivity timer, the method 300 avoids deleting records whose original expiration values may have passed, but are still being frequently accessed by users. Currently, an administrator may be required to manually search the DNS query log for accesses to the record, or to arbitrarily set an expiration value for a record and to manually delete the record on that date, even though users may still be frequently accessing the record.

Figure 4:
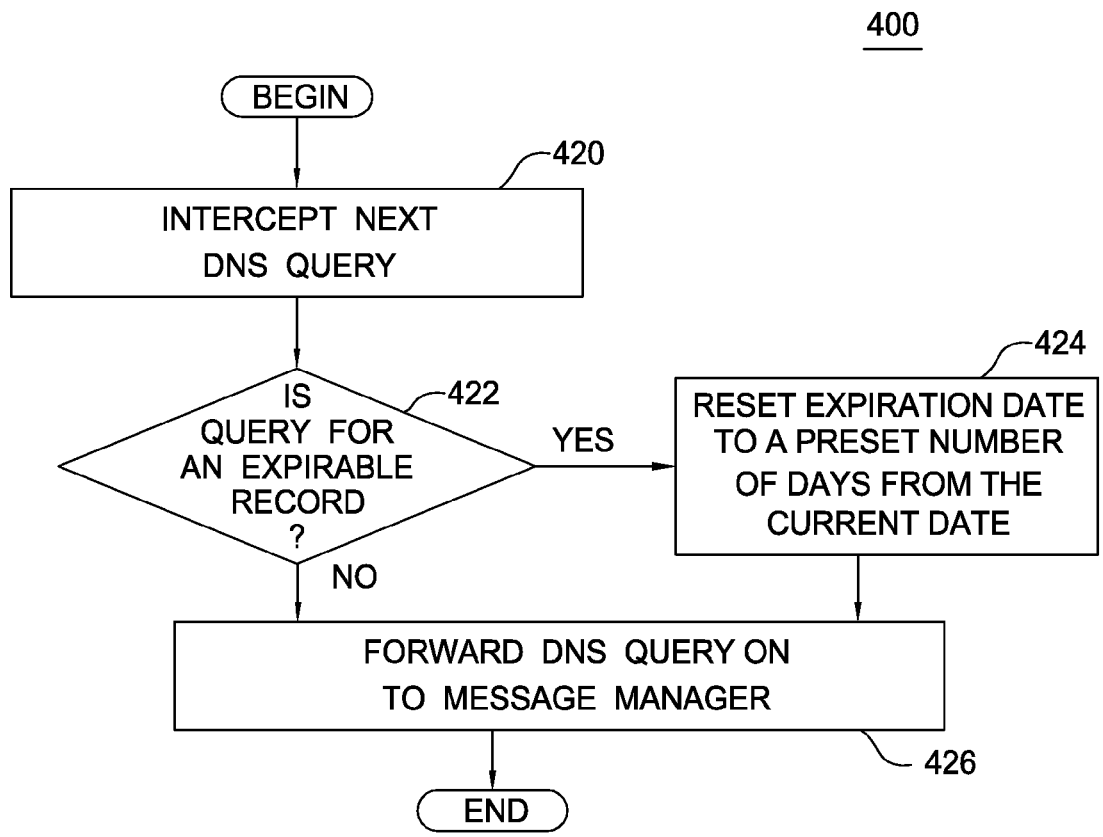
FIG. 4 is a flow diagram illustrating a method for managing expiring records in a DNS database.

FIG. 4 is a flow diagram illustrating a method for managing expiring records in a DNS database. As shown, the method 400 begins at step 420, where the alias manager component 270 intercepts the next DNS query. In the pictured method 400, the alias manager component 270 intercepts the DNS query before it reaches the message manager 274. In another embodiment, the alias manager component 270 may simply listen to traffic passing to the message manager 274, and avoids intercepting the queries.

In either case, once the alias manager component 270 receives the DNS query, the alias manager component 270 determines whether the query is for an expirable record (step 422). If the alias manager component 270 determines the query is for an expirable record, the alias manager component 270 updates the expiration value to a number of days from the current date (step 424). In one embodiment, the alias manager component 270 updates the expiration value of the record based on the period of time specified in the inactivity timer for the record. Once the expiration value is updated (step 424), or if the alias manager component 270 determines the query was not for an expirable record (step 422), then the alias manager component 270 forwards the DNS query on to the message manager 274 for further processing (step 426). After the query has been forwarded, the method ends.

One advantage to the method 400 is that the expiration values of records may be updated in real-time as DNS queries are received. This allows for faster and more efficient batch processing on the records. That is, because the expiration value are updated in real-time based on accesses to the records, any batch processing only needs to compare the current date and the expiration value of the record to determine whether the expirable records have expired. In other words, if method 400 is used, the batch processing no longer needs to search the DNS query log 276 in order to determine whether the expirable record has been accessed, and update the expiration value of the record accordingly (as done in method 300).

Figure 5A:
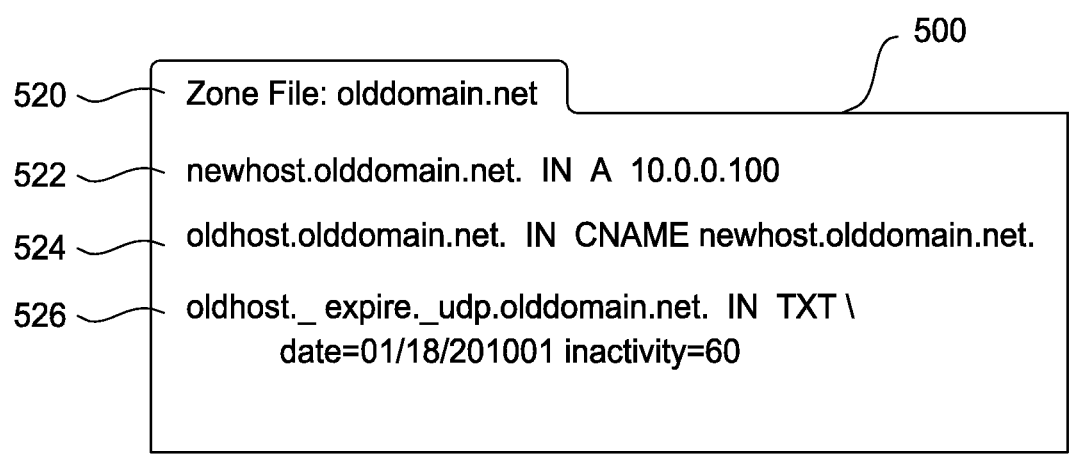
FIGS. 5A-5B illustrate exemplary hostname aliases and domain name aliases, according to one embodiment of the invention.
Figure 5B:
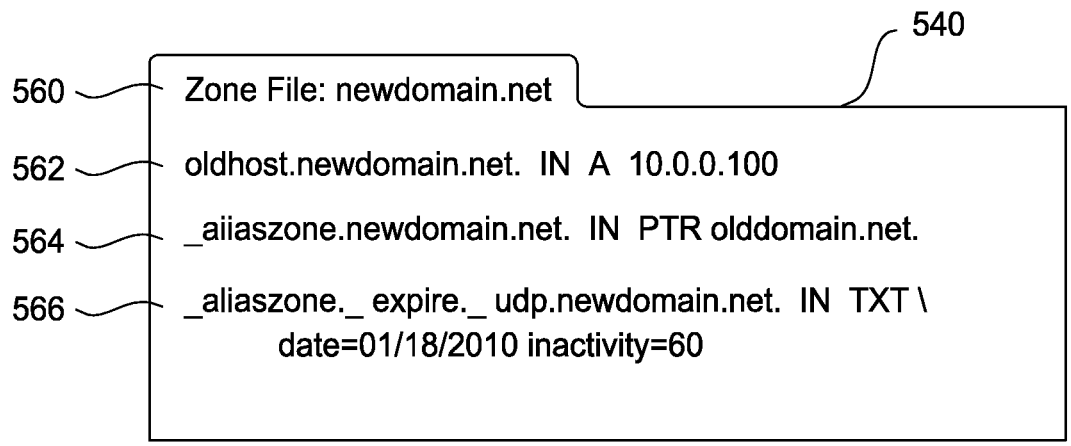
Figure 5B:
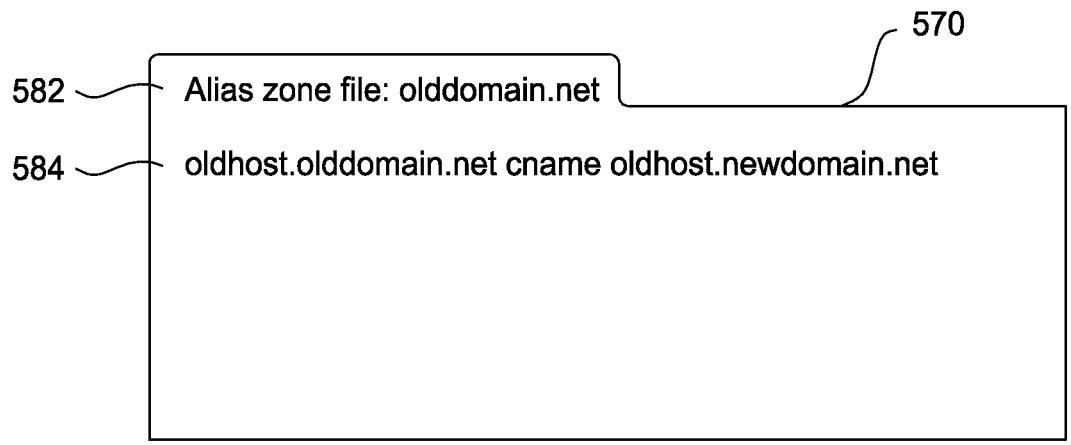

FIGS. 5A-5B illustrate exemplary hostname aliases and domain name aliases, according to one embodiment of the invention. As shown, FIG. 5A shows an exemplary expirable record 500 containing a host alias, according to one embodiment of the invention. Generally, FIG. 5A shows an expirable record specifying a host of "newhost" for the domain of "olddomain.net", and contains an expirable alias from host "oldhost" that maps to "newhost". The expirable record 500 has a file name 520 of "olddomain.net", indicating that the file corresponds to the domain "olddomain.net". The first line 522 of the expirable record 500 shows the host "newhost", with the full address "newhost.olddomain.net", and the current associated IP address for this address "10.0.0.100". Thus, the first line 522 of the exemplary expirable record 500 is much like a current DNS entry, in that it contains a DNS address (including a host and a domain) and an associated IP address.

The second line 524 of the expirable record 500 shows an alias mapping the host "oldhost" and domain "olddomain.net" to the address of "newhost.olddomain.net". Thus, the second line 522 indicates that DNS requests for "oldhost.olddomain.net" will be routed to the address "newhost.olddomain.net". Currently, a CNAME record such as this may be created manually by an administrator, in order to redirect traffic from one host to another host.

The third line 526 of the expirable record 500 indicates that the alias on line 524 is an expirable alias, containing an expiration value and an inactivity timer. As shown, this line 526 indicates that host "oldhost" at domain "olddomain.net" expires on expiration value Jan. 18, 2010. Furthermore, the line 526 indicates the inactivity timer for this alias is 60 days. Thus, according to embodiments of the invention, if on Jan. 18, 2010, the alias manager component 270 determines that the expiration value has expired, and further determines that the expirable record 500 has not been accessed by a DNS query in the past 60 days, the alias manager component 270 may automatically delete the expirable record 500.

One advantage to specifying the expirable record in a zone file 500, as shown in line 526, is that it may coexist with current DNS technology without causing errors and without unintended consequences. That is, although current message managers 274 may read line 526 when parsing the zone file 500, the line 526 may be formatted such that the message managers 274 will simply ignore it and do nothing in response to reading the line. Thus, by specifying expirable records in the format shown in FIG. 5A, the expirable records may unobtrusively coexist with current DNS message managers 274. Of course, one of ordinary skill in the art will recognize that other methods of specifying an expirable record may be used. Illustrative examples of other formats for expirable records include, but are not limited to, XML, database fields and tables, properties files and generally any format capable of the functions described herein.

FIG. 5B shows an exemplary expirable record 540 for a domain alias, according to one embodiment of the invention. Generally, FIG. 5B shows an expirable record specifying a host of "oldhost" for the domain of "newdomain.net", and contains an alias from domain "olddomain.net" that maps to domain "newdomain.net". As shown, the expirable record 540 is a file with filename "newdomain.net" 560, indicating that the record corresponds to domain "newdomain.net". The first line 562 of the expirable record 540 shows the host "oldhost" and domain "newdomain.net", with the full address "oldhost.newdomain.net", and the current associated IP address for this address "10.0.0.100". Thus, the first line 562 of the exemplary expirable record 540 is much like a current DNS entry, in that it contains a DNS address (including a host and a domain) and an associated IP address.

The second line 524 of the expirable record 540 shows an alias zone record for the domain "newdomain.net". Furthermore, the second line 524 indicates that the alias is contained in the alias zone file named "olddomain.net". As shown, FIG. 5B also shows an exemplary alias zone file 570, according to one embodiment of the invention. The alias zone file 570 has a filename of "olddomain.net" 582. As shown, the first line 584 of the alias zone file 570 contains an alias mapping the address of "oldhost.olddomain.net" to "oldhost.newdomain.net". Thus, line 584 in the alias zone file 570 indicates that DNS requests for the address "oldhost.olddomain.net" will be routed to the address "oldhost.newdomain.net". Currently, a CNAME record such as this may be created manually by an administrator, in order to redirect traffic from one domain name to another domain name.

In the pictured embodiment, the third line 566 of the expirable record 540 indicates that the alias on line 564 is an expirable alias, containing an expiration value and an inactivity timer. As shown, this line 566 indicates that the alias specified on line 564 for domain "olddomain.net" expires on expiration value Jan. 18, 2010. Furthermore, the third line 566 indicates the inactivity timer for this alias is 60 days. Thus, according to embodiments of the invention, if on Jan. 18, 2010, the alias manager component 270 determines that the expiration value has expired, and further determines that the expirable record 540 has not been accessed by a DNS query in the past 60 days, the alias manager component 270 may automatically delete the expirable portions of the record 540, namely lines 564 and 566, and the corresponding alias zone file 570.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method of managing aliases on a domain name system (DNS) database on a server, comprising:
reading an expirable record contained in the DNS database, wherein the expirable record includes (i) an alias value mapping a previous address of a web resource to a new address of the web resource, (ii) an expiration value indicating a time at which the expirable record is considered expired, and (iii) an inactivity timer specifying a period of time the expirable record remains inactive before the expirable record is considered expired;
at a first time, based upon determining that the expirable record has been queried within the period of time specified by the inactivity timer, extending the expiration value within the expirable record based on a first current time value corresponding with the first time; and
at a second time, based upon determining that the expiration value of the expirable record has passed by comparing the expiration value with a second current time value corresponding with the second time, deleting the expirable record, whereby the DNS database considers subsequent requests for the previous address of the web resource to be invalid.

2. The method of claim 1, further comprising:
receiving a query specifying a requested address;
determining that the requested address is the same as the first address specified in the expirable record; and
adjusting the expiration value of the expirable record based on the inactivity timer and the current time value.

3. The method of claim 2, further comprising:
forwarding the query on to a message manager, wherein the message manager processes the query and responds with an IP address associated with the address specified in the query.

4. The method of claim 1, wherein the first address comprises i) a host name, ii) a domain name or iii) both the host name and the domain name.

5. The method of claim 1, further comprising:
presenting a user with an interface for modifying a record;
receiving a selection of a first record from the user, specifying i) a new host name, ii) a new domain name or iii) both the new host name and the new domain name for the first record; and
creating a new record based on the specified i) new host name, ii) new domain name or iii) both the new host name and the new domain name.

6. The method of claim 1, wherein determining whether the expirable record has been queried within the period of time specified by the inactivity timer, further comprises:
searching a DNS query log stored on the server for at least one query that references the expirable record, and
if at least one query is found in the DNS query log:
determining that the expirable record has been queried within the period of time specified by the inactivity timer; and
if at least one query is found in the DNS query log, adjusting the expiration value of the expirable record based on the inactivity timer and the current date.

7. The method of claim 1, wherein the server is a DNS server, and the expirable record is defined as a CNAME record contained on the DNS server.

* * * * *